(12) United States Patent
Adams (10) Patent No.: US 7,814,853 B2
(45) Date of Patent: Oct. 19, 2010

(54) FORCED AIR CAVITY AND CONTROL SYSTEM FOR WATERCRAFT

(76) Inventor: Parke S. Adams, 301 E. E St., Casper, WY (US) 82601

( * ) Notice: Subject to any disclaimer, the term of this patent is extended or adjusted under 35 U.S.C. 154(b) by 0 days.

(21) Appl. No.: 12/314,321

(22) Filed: Dec. 8, 2008

(65) Prior Publication Data

US 2010/0139542 A1   Jun. 10, 2010

(51) Int. Cl.
  *B62B 15/00* (2006.01)
(52) U.S. Cl. .................. 114/43; 114/289; 114/291
(58) Field of Classification Search ............ 114/43, 114/288, 289, 291
  See application file for complete search history.

(56) References Cited

U.S. PATENT DOCUMENTS

| | | | |
|---|---|---|---|
| 1,408,178 A | | 2/1922 | Downing |
| 2,172,674 A | * | 9/1939 | Frost ............ 114/288 |
| 2,364,845 A | | 12/1944 | Glen |
| 2,855,885 A | * | 10/1958 | Miller ............ 114/43 |
| 3,547,064 A | | 12/1970 | Glass |
| 4,231,314 A | * | 11/1980 | Peters ........... 114/291 |
| 4,392,445 A | | 7/1983 | Burg |
| 4,926,771 A | * | 5/1990 | Hull ............ 114/289 |
| 4,993,349 A | | 2/1991 | Solari |
| 5,146,863 A | | 9/1992 | Ford |
| 5,277,141 A | * | 1/1994 | Csepregi ........... 114/43 |
| 5,524,568 A | | 6/1996 | Bobst |
| 6,250,246 B1 | | 6/2001 | Hubley |
| 6,868,798 B2 | * | 3/2005 | Robinson et al. ........ 114/288 |
| 6,957,620 B1 | | 10/2005 | Wheeler |
| 6,981,460 B1 | | 1/2006 | Wheeler et al. |
| 7,004,094 B2 | | 2/2006 | Carson |
| 7,004,832 B2 | * | 2/2006 | Thomas ............ 454/94 |
| 7,311,058 B1 | | 12/2007 | Brooks et al. |
| 2002/0014192 A1 | | 2/2002 | Takahashi et al. |
| 2005/0279269 A1 | | 12/2005 | Robinson et al. |
| 2006/0231004 A1 | | 10/2006 | Stubblefield et al. |

FOREIGN PATENT DOCUMENTS

DE    42 36 114 A1    4/1994
JP    6-87487 A    3/1994

OTHER PUBLICATIONS

Slippery ships float on thin air, New Scientist Tech, http://technology.newscientist.com/article/mg18925391.600, 6 pages printed from the Internet on Sep. 20, 2008.

* cited by examiner

*Primary Examiner*—Lars A Olson
(74) *Attorney, Agent, or Firm*—Richard C. Litman (57) ABSTRACT

The forced air cavity and control system for watercraft provides a source of compressed air against the hull, the compressed air being distributed via a pivotally adjustable air scoop mounted proximate the front of the boat, to which is connected a series of conduits (air passageways) leading downwardly from the housing. The conduits exit at openings in a V-shaped step in the hull of the watercraft to emit high pressure air against the hull to thereby reduce friction caused by hull contact with the water. A hydraulic ram operably connected to the air scoop provides a means of pivotal adjustment. A plurality of ice runners is provided on the bottom of the watercraft to increase stability of control under reduced water friction conditions.

19 Claims, 10 Drawing Sheets

FORCED AIR CAVITY AND CONTROL SYSTEM FOR WATERCRAFT

BACKGROUND OF THE INVENTION

1. Field of the Invention

The present invention relates generally to watercraft design and construction, and particularly to a forced air cavity and control system for watercraft that reduces friction against the hull of the watercraft as it moves through the water, increasing speed and fuel efficiency.

2. Description of the Related Art

Boats are used both for transportation and for water sports and other leisure-time activities. Both the boat's speed and fuel efficiency are a matter of concern to most boaters. The hull can encounter considerable drag as it moves through the water, decreasing the boat's speed and requiring more power to maintain a desired speed, thereby increasing fuel consumption. Naval architects and designers of pleasure craft can reduce the magnitude of the problem to some extent by careful design of the shape of the hull and the choice of materials.

Nevertheless, due to the rising costs of fuel and the desire of sportsmen for increasing the speed of their boats, there is a demand for other measures for decreasing the drag between the hull and the water.

Thus, a forced air cavity and control system for watercraft solving the aforementioned problems is desired.

SUMMARY OF THE INVENTION

The forced air cavity and control system for watercraft provides a source of compressed air against the hull, the compressed air being distributed by a pivotally adjustable air scoop mounted proximate the front of the boat, to which is connected a series of conduits (air passageways) leading downwardly from the housing. The conduits exit at openings in a V-stepped external portion of the lower hull of the watercraft to emit high pressure air against the hull in order to reduce friction caused by hull contact with the water.

A hydraulic ram, which is operably connected to the air scoop, provides for pivotal adjustment of airflow. A plurality of ice runners may be provided on the bottom of the watercraft to increase stability of control under reduced water friction conditions.

These and other features of the present invention will become readily apparent upon further review of the following specification and drawings.

DETAILED DESCRIPTION OF THE PREFERRED EMBODIMENTS

Figure 1:
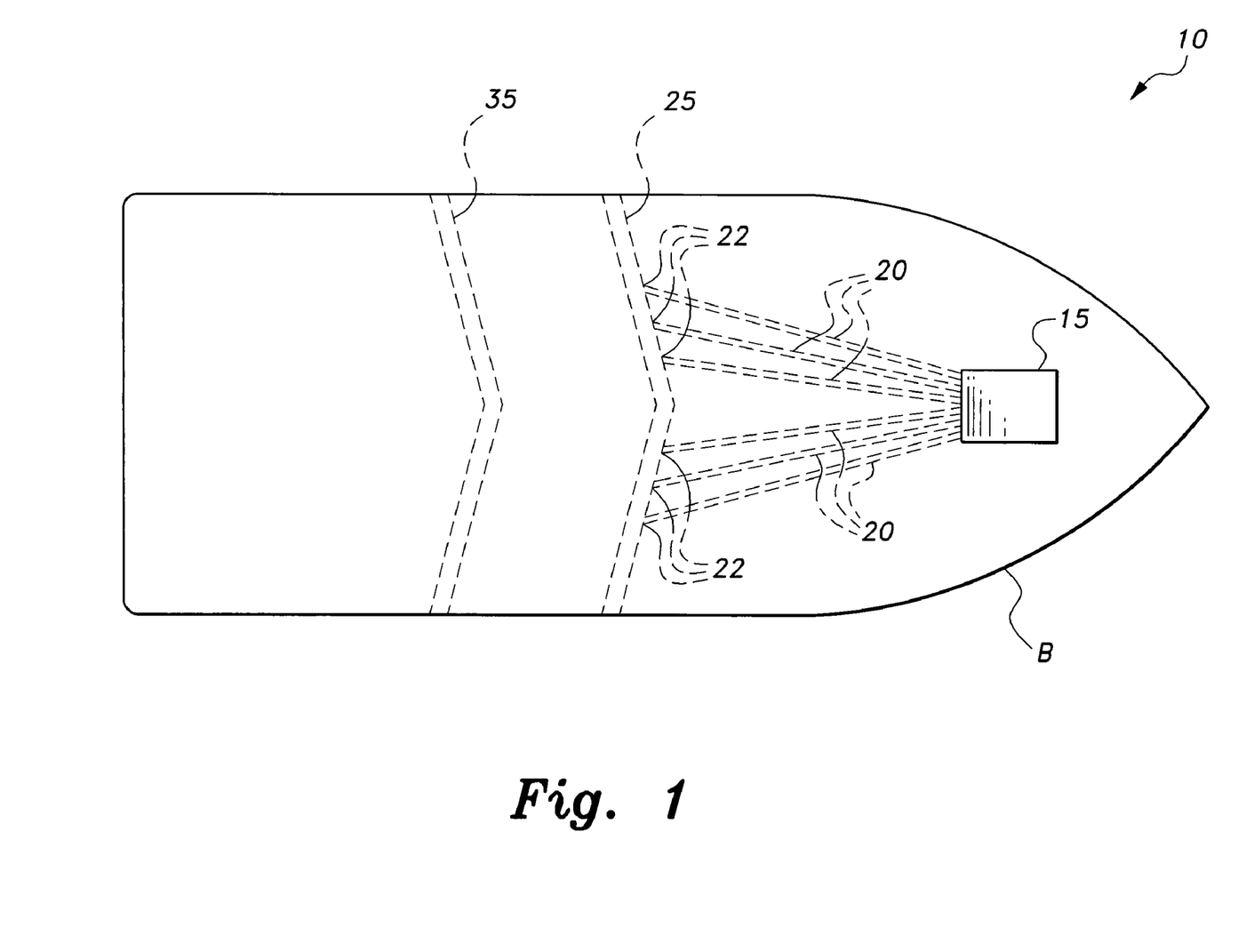
FIG. 1 is a diagrammatic plan view of a forced air cavity and control system for watercraft according to the present invention.
Figure 2:
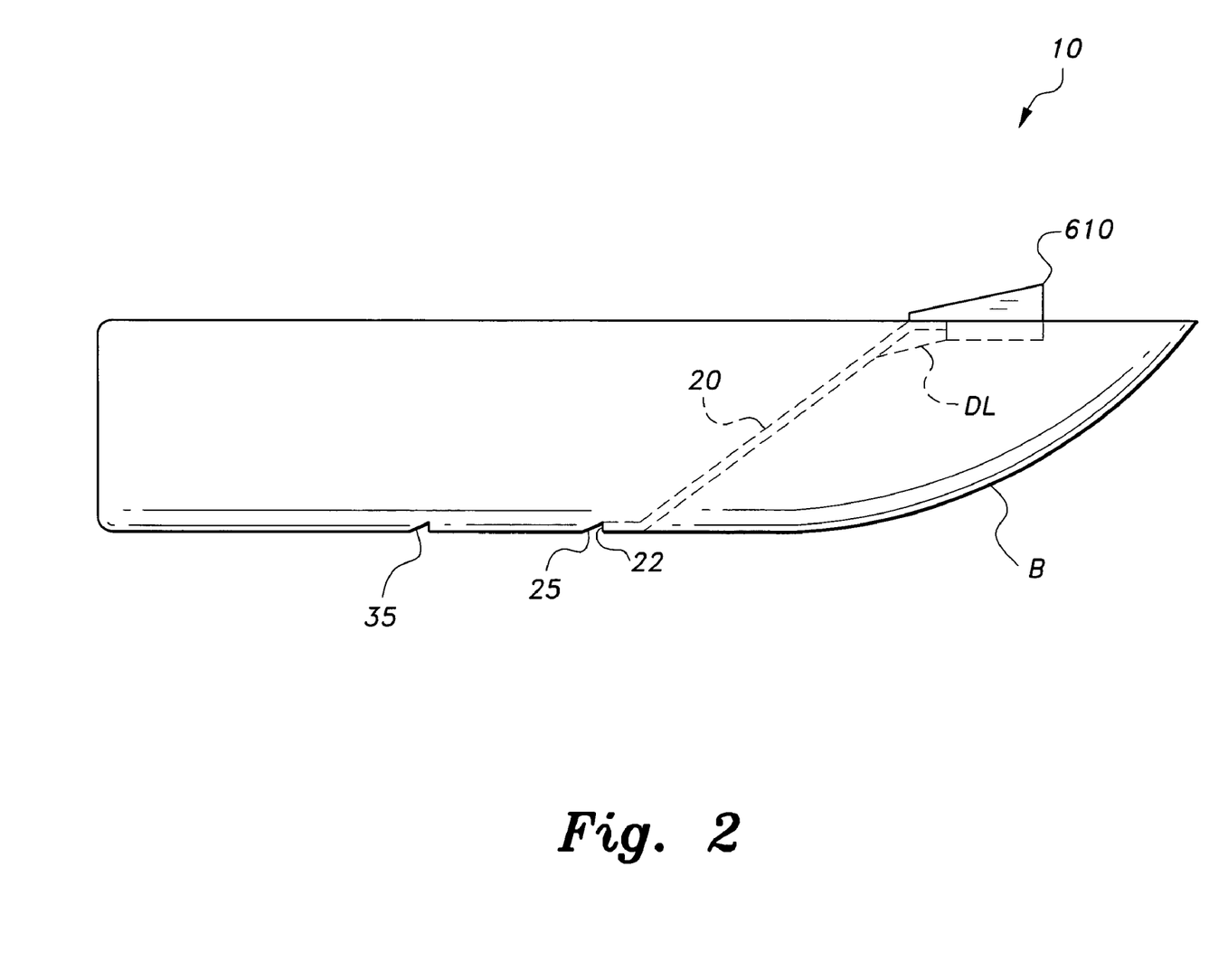
FIG. 2 is a diagrammatic environmental side view of a forced air cavity and control system for watercraft according to the present invention.
Figure 3:
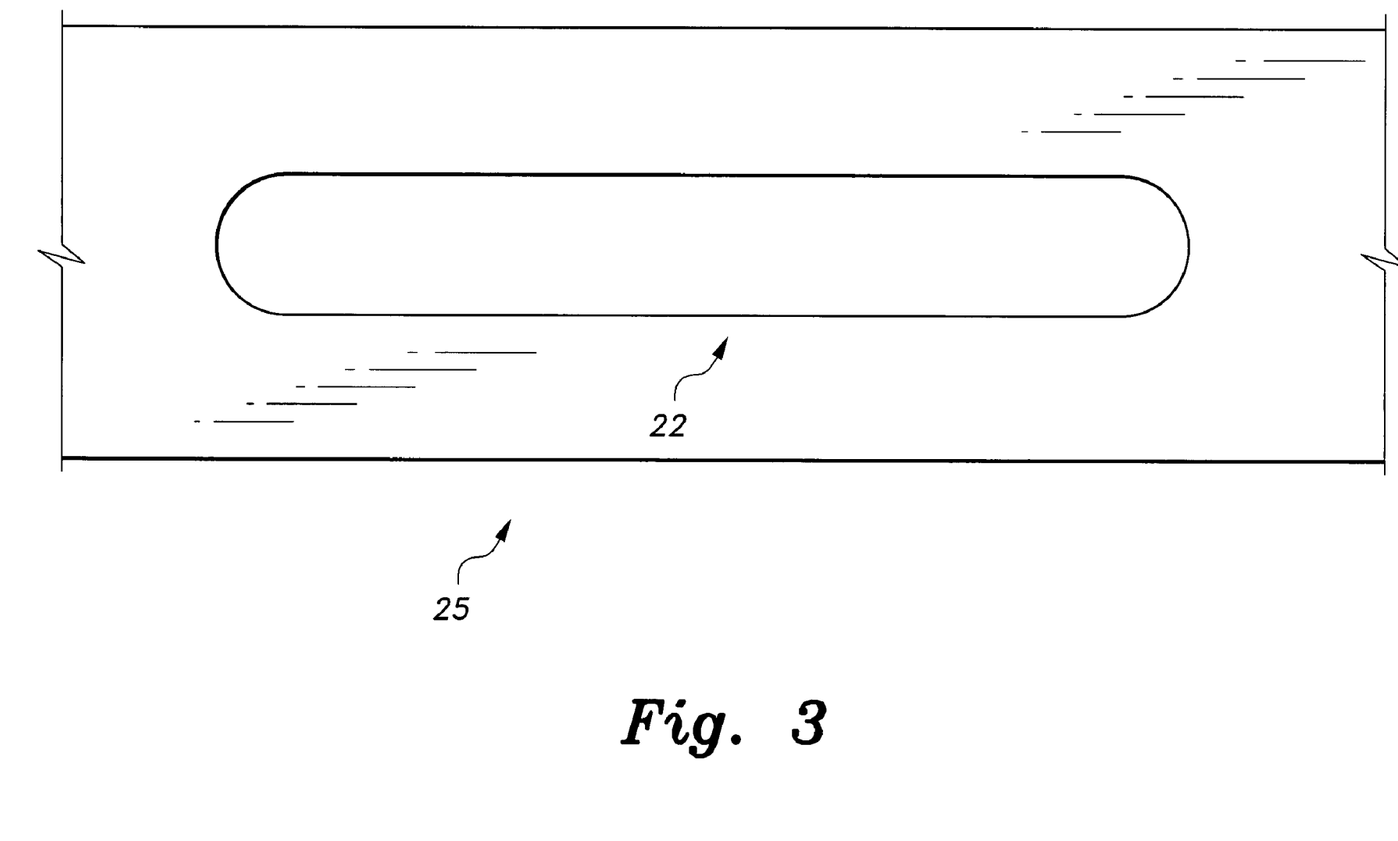
FIG. 3 is a side elevation view of a step and exhaust port for a forced air cavity and control system for watercraft according to the present invention.

As shown in FIGS. 1-2, the forced air cavity and control system for watercraft, designated generally as 10 in the drawings, provides a source of compressed air against the hull of boat B and includes an adjustable air intake housing 15 mounted proximate the front of the boat B, to which is connected a series of conduits 20 (air passageways) leading downwardly from the housing 15. The conduits 20 exit through the hull of the boat B to emit forced air via outlet port 22 disposed in V-step 25 in order to reduce friction as the boat B travels through water. As shown in FIGS. 2-3, the air outlet port 22 is disposed in a substantially vertical portion of V-step 25.

Figure 4:
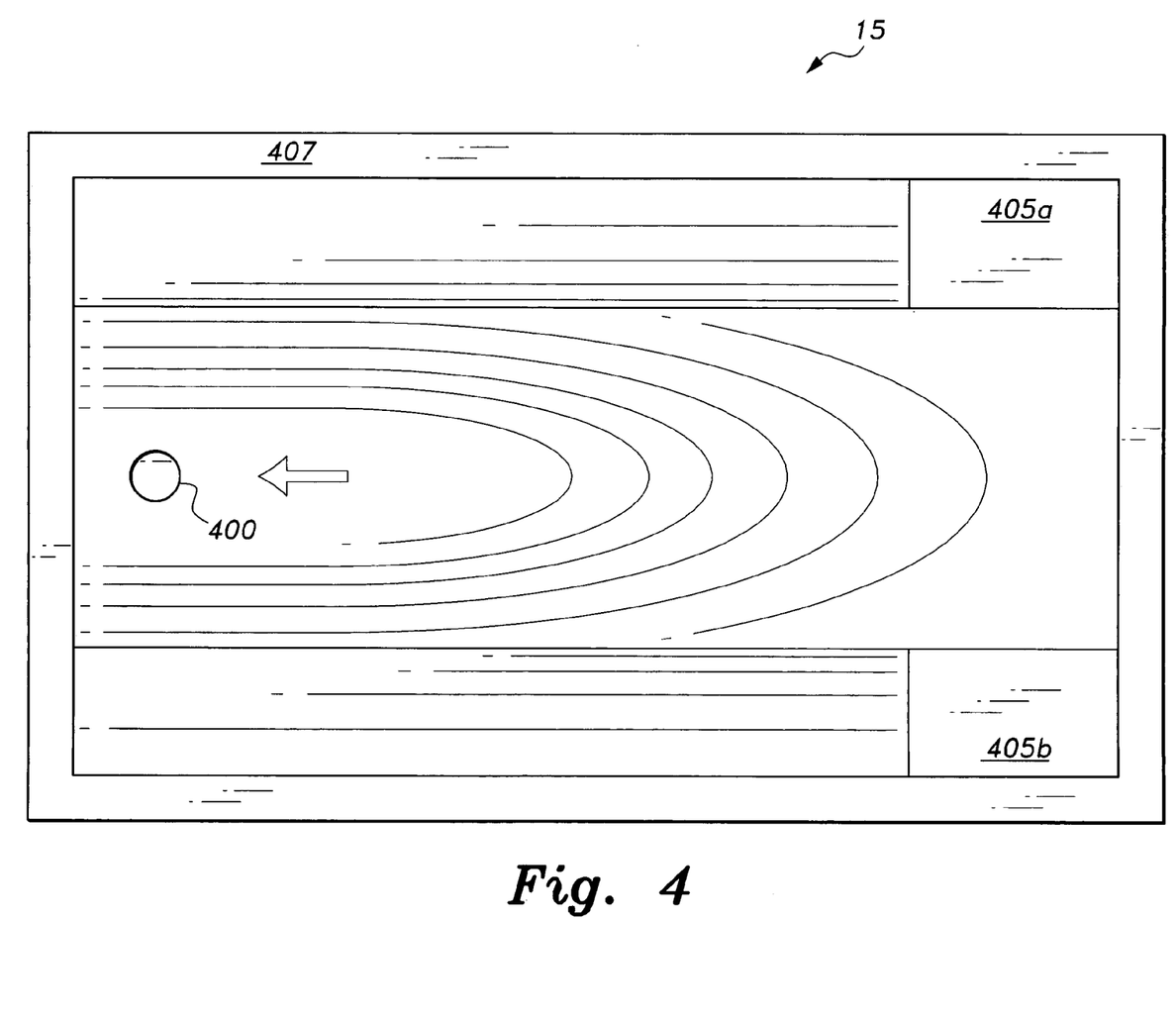
FIG. 4 is a plan view of an air intake housing in a forced air cavity and control system for watercraft according to the present invention.
Figure 5:
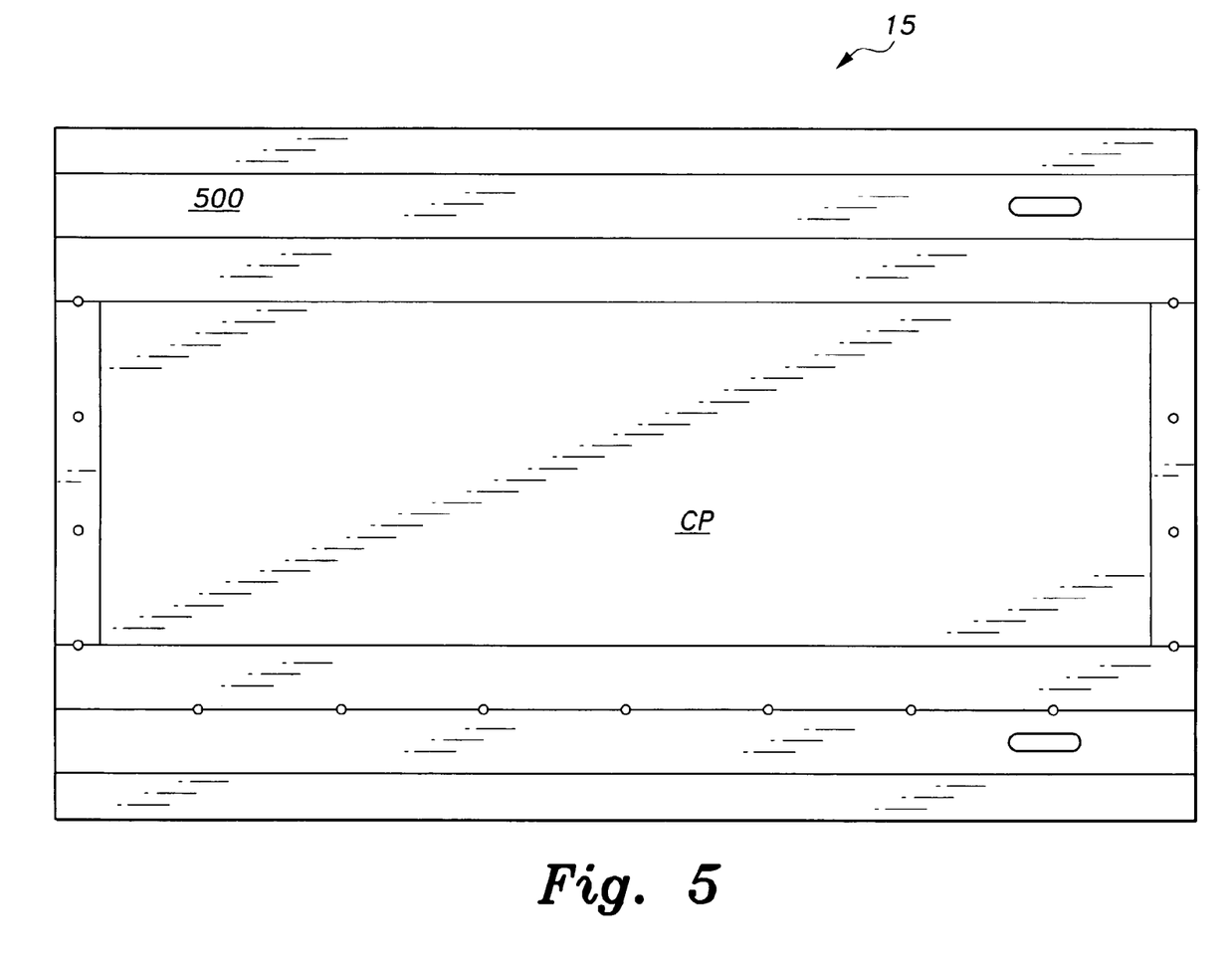
FIG. 5 is a plan view of an air intake housing for a forced air cavity and control system for watercraft showing an attached cover plate according to the present invention.
Figure 6:
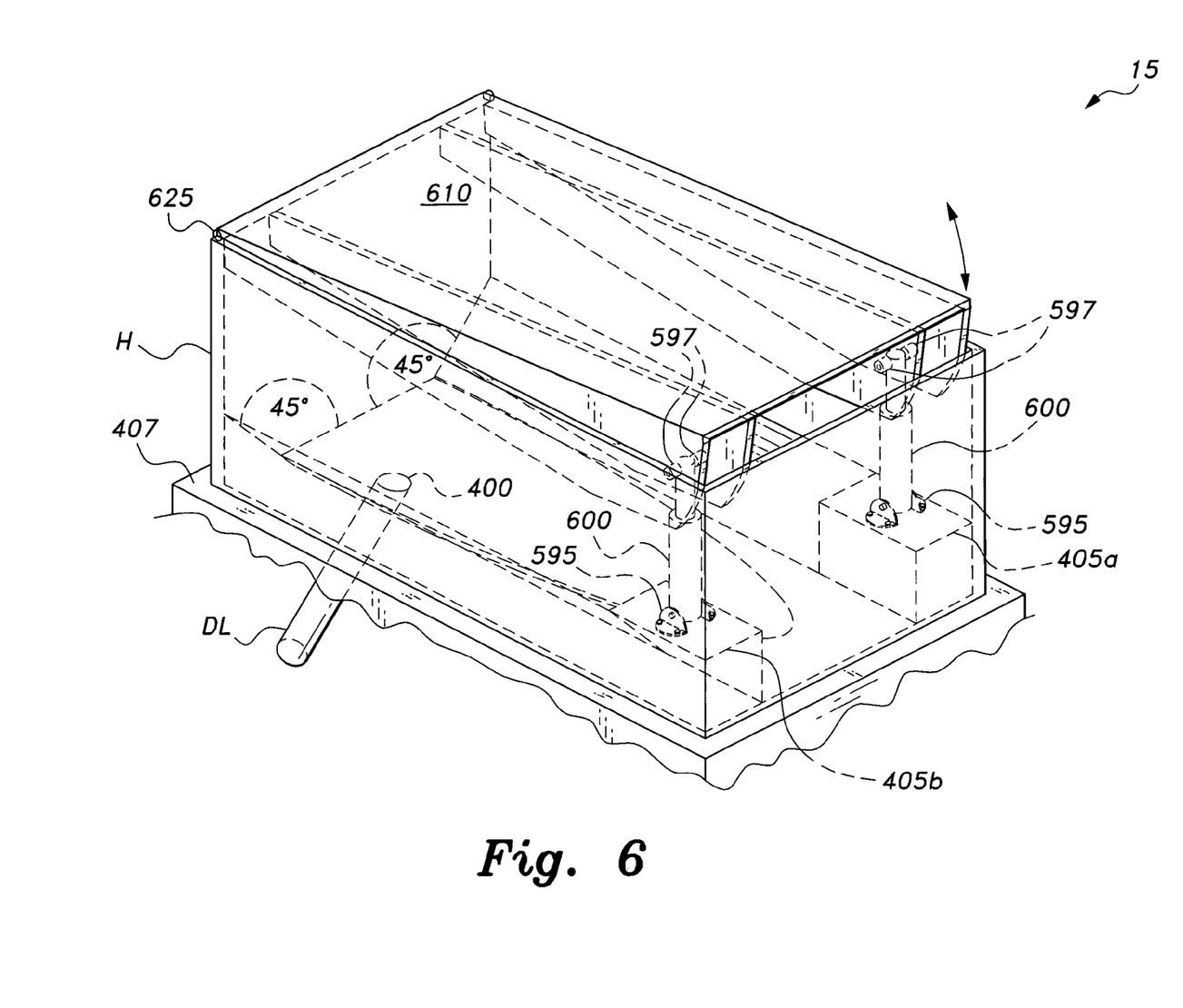
FIG. 6 is a partial perspective view of a forced air cavity and control system for watercraft according to the present invention, showing a detailed view of the air intake housing.

As shown in FIGS. 2 and 6, Hydraulic rams 600 are operatively connected to a pivotal air scoop 610 disposed in the housing 15 to provide for height adjustment of the air scoop 610. A drain line DL extending from a support area basin of housing 15 is connected to at least one air conduit 20 to provide suction that keeps the support area basin under air scoop 610 free of excess water. As shown in FIG. 4, the air scoop support area basin of housing 15 includes an air chamber cavity having a concave basin that directs water leakage to drain 400. The scoop support area basin of housing 15 is mounted to the hull by top deck mounting plate 407. Mounting bosses 405a and 405b are included for support attachment of hydraulic rams 600. As shown in FIG. 5, a cover plate CP having elongate member 500 can be disposed above the air scoop support area basin of housing 15.

Figure 10:
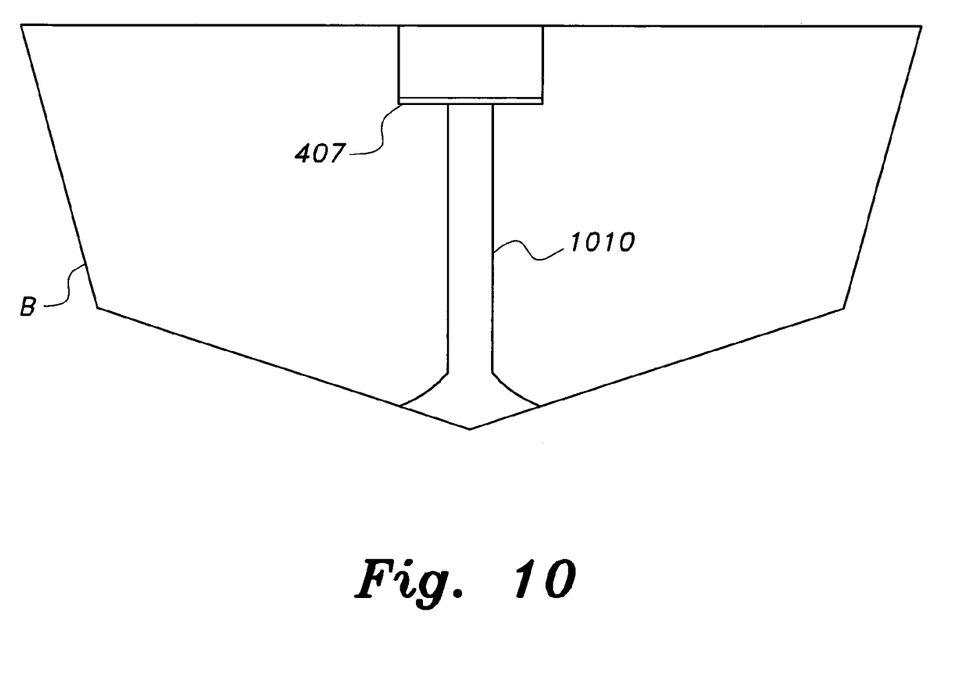
FIG. 10 is a diagrammatic environmental rear view of a support brace for the mounting plate of a forced air cavity and control system for watercraft according to the present invention, shown with the boat transom removed, Similar reference characters denote corresponding features consistently throughout the attached drawings.

As shown in FIG. 6, the air scoop 610 is pivotally attached by hinge 625 to air scoop housing 15 at hull column H. Cylinder portions of the hydraulic rams 600 are connected to portside mounting pad 405a and starboard mounting pad 405b at the base of the cylinder by a suitable clevis bracket 595. Piston portions 597 of the hydraulic rams 600 are pivotally connected to air scoop 610 at opposing sides of the front end of air scoop 610. The water drain line DL extends from the drain hole 400 of support basin of housing 15. As shown in FIG. 10, the mounting plate 407 is reinforced by a columnar brace 1010 that extends from the hull of boat B.

Figure 7:
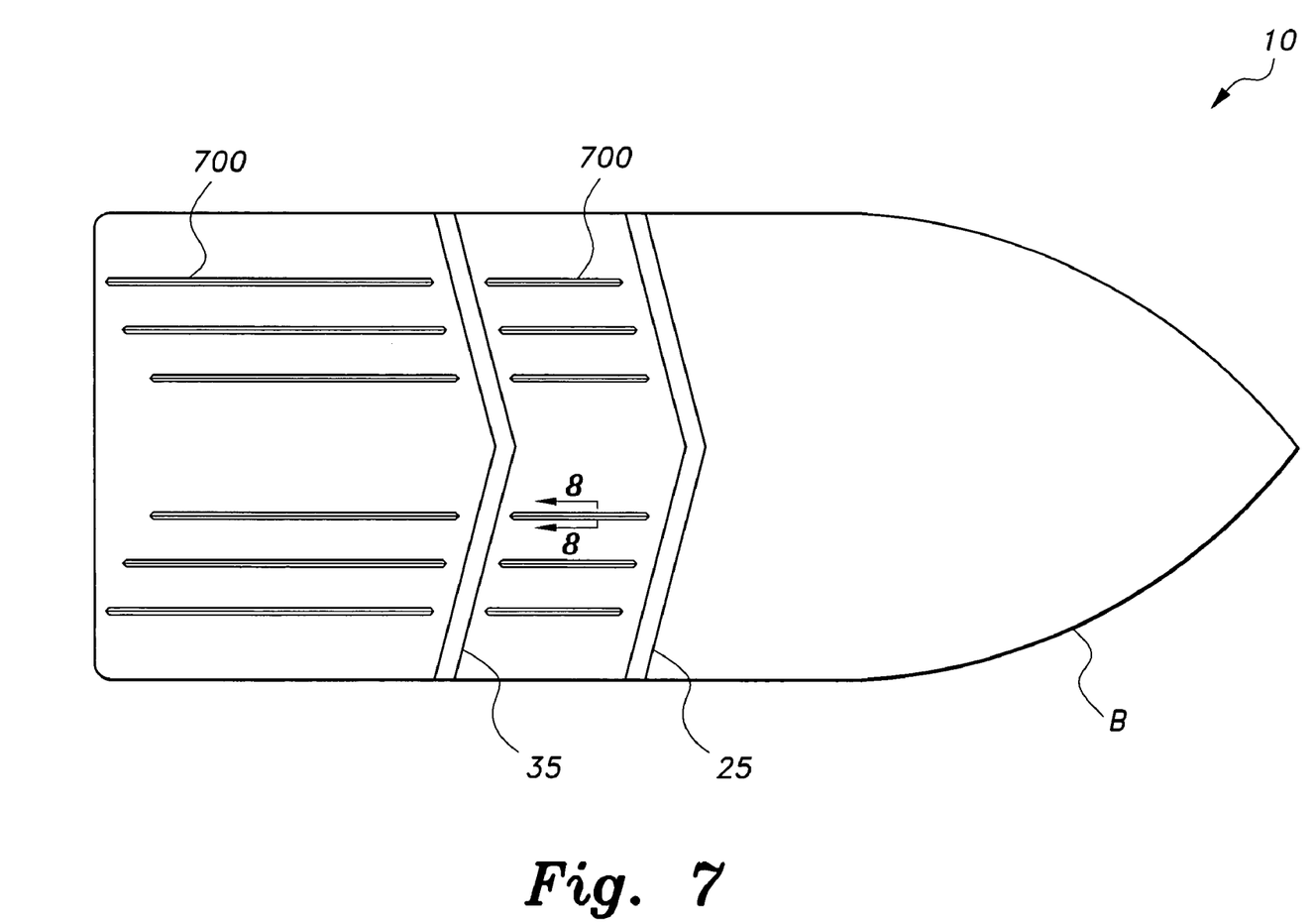
FIG. 7 is a diagrammatic bottom view of the hull of a watercraft having a forced air cavity and control system for watercraft according to the present invention.
Figure 8:
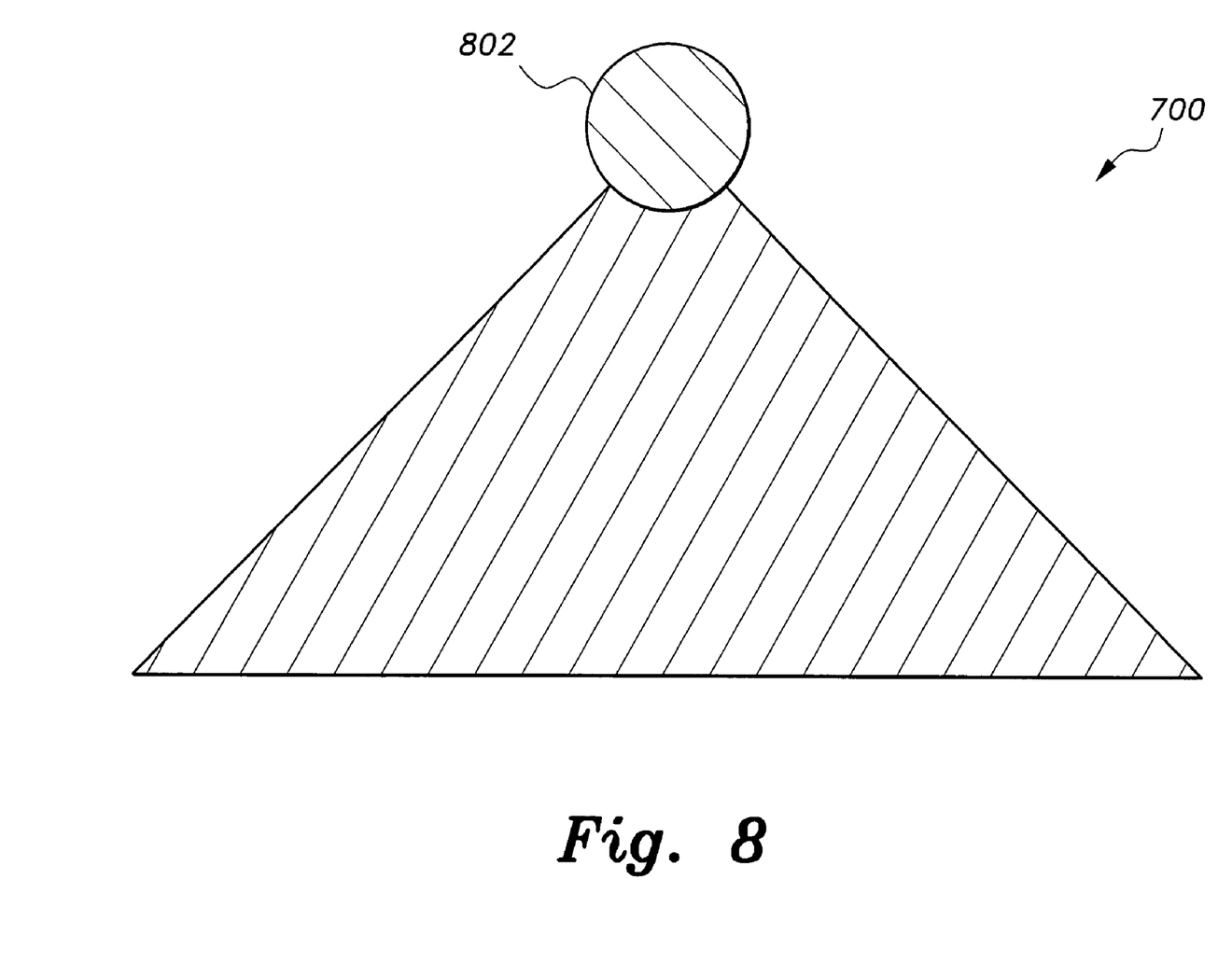
FIG. 8 is a section view through an ice runner, drawn along lines 8-8 of FIG. 7.

As shown in FIGS. 1 and 7, a rear V-shaped step 35 provides passive lift, while forward V-shaped step 25, having the air outlets 22, provides adjustable active planning lift for boat B. A plurality of elongate ice runners 700, having a substantially triangular cross section, extend longitudinally on the hull of boat B. The ice runners 700 provide additional control stability to watercraft B, notwithstanding the loss of friction between the hull and the water produced by operation of the forced air system 10. As most clearly shown in FIG. 8, a longitudinally extending dowel 802 is disposed on the apex of ice runner 700.

Figure 9:
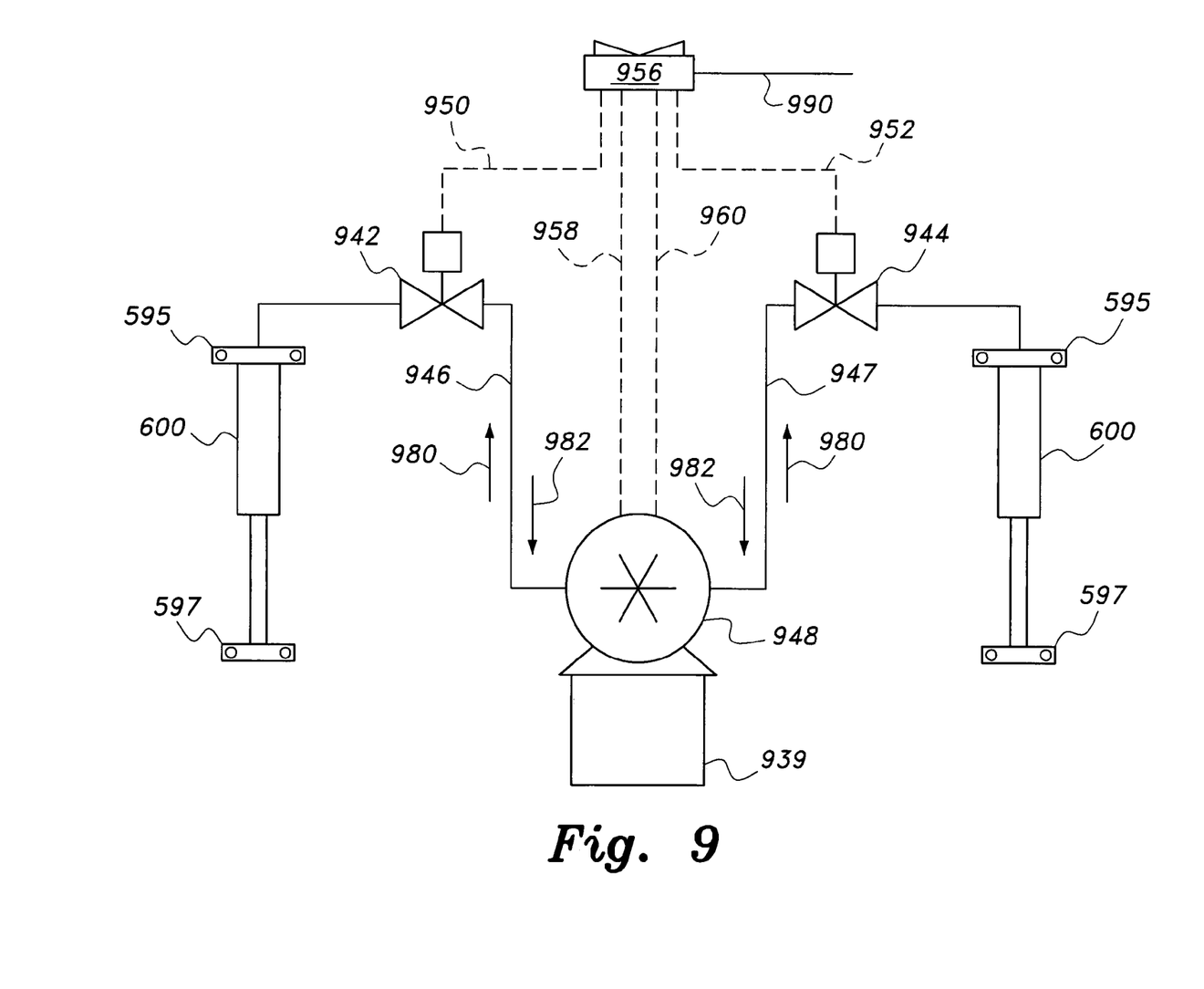
FIG. 9 is a schematic diagram of a hydraulic circuit for a forced air cavity and control system for watercraft according to the present invention.

As shown in FIG. 9, the rams 600 are hydraulically actuated and are part of a trim tabs kit. The hydraulic rams 600 are controlled by electric valves 942 and 944 that provide communication to main hydraulic lines 946 and 947, which are pressurized by a bidirectional fluid pump 948. The valves 942 and 944 are operated by electric control lines 950 and 952, which supply a valve control voltage responsive to rocker toggle switch 956. Pump control electric lines 958 and 960 are adapted to operate the pump 948 in either an air scoop retract or air scoop extend mode.

In general, the pump 948 is adapted to either extend or retract the air scoop 610, pistons 597 being attached thereto. For example, the pump 948 may be a dual rotation motor, which can rotate in either direction to apply pressure to lines 946 and 947, or alternatively, to apply negative gauge pressure thereto. As most clearly shown in FIG. 9, which is a schematic illustration of the air scoop hydraulic and electric circuitry the hydraulic rams 600 actuate to extend and retract the air scoop 610. Essentially, the four electrical lines 950, 952, 958 and 960 provide power to operate the solenoid valves 942 and 944 and the direction (up/down) of the pump 948 respectively. The pump 948 is adapted to apply pressure and direct flow in the direction indicated at 980 through lines 946 and/or 947 where the flow passes through to solenoid valves 942 and/or 944. Alternatively, the flow can be reversed to simultaneously retract the hydraulic rams 600 when the pump 948 reverses direction, and the flow will occur in a direction indicated by arrow 982, where hydraulic fluid will pass through solenoid valves 942 and 944 to retract the hydraulic rams 600, thereby lowering the air scoop 610. The pump further is adapted to extract fluid from the fluid reservoir 939 when extending the rams 600 or pull fluid from the rams 600, creating a negative gauge pressure therein and pumping the fluid back into the fluid reservoir 939.

The up/down toggle switch 956 is a rocker type switch, which is normally open, and works to switch voltage originating from power line 990 to operate the valves and the pump for activating the hydraulic rams 600, thereby raising/lowering air scoop 610. While two independent switches could be used to control each of the rams 600, the single up/down rocker style toggle switch 956 ensures simultaneous engagement of both rams 600 in the same direction for stable extension/retraction operation of air scoop 610. Instead of hydraulic rams, the control system may use a pneumatic control system with an air compressor and pneumatic cylinders, if desired.

When the watercraft B is not in motion, the hydraulic rams 600 can be commanded via hydraulic control switch 956 to completely extend the pistons 597 to place the pivotally adjustable air scoop 610 in its upwardmost position. As the watercraft B moves forward, air pressure due to increasing air intake at air scoop 610 builds up within the system 10, specifically within the air delivery ducts 20. The high pressure air flows through the delivery ducts 20 and escapes under the craft at outlet ports 22 to thereby release the craft of considerable water friction. The ice runners 35 at the bottom of watercraft B act as control surfaces, containing the air to provide the watercraft B with increased agility and control while maintaining lower water friction operation of the craft B. After the airflow has achieved a more or less steady state, and the watercraft picks up more speed, the pivotally adjustable air scoop 610 can be retracted by the hydraulic control system to an optimal performance position for a given speed desired by operator of watercraft B. Speed, fuel efficiency and agility of the watercraft are thus improved by operation of the forced air cavity and control system.

It is to be understood that the present invention is not limited to the embodiment described above, but encompasses any and all embodiments within the scope of the following claims.

I claim:

1. A forced air cavity and control system for a watercraft, comprising:
    a housing defining an air chamber adapted for mounting atop the watercraft;
    an air scoop pivotally attached to the air chamber, the air scoop adjustably pivoting to regulate a flow rate of air into the air chamber when the watercraft is in motion;
    at least one air passageway connected to the air chamber;
    at least one V-shaped step defined in a hull of the watercraft, the step having at least one air outlet port defined therein, the air passageway extending to the air outlet port, the V-shaped step being formed by two legs; and
    a plurality of elongate ice runners adapted for extending longitudinally on the hull of the watercraft and located aft of the at least one V-shaped step,
    wherein air entering the scoop is ejected from the air outlet port, the ejected air reducing drag on the hull of the watercraft.

2. The forced air cavity and control system for watercraft according to claim 1, further comprising a dowel extending longitudinally along the elongate ice runners.

3. The forced air cavity and control system for watercraft according to claim 1, wherein said at least one air outlet port comprises a plurality of air outlet ports, said at least one air passageway comprising a first plurality of air passageways connected to the air outlet ports disposed in one leg of the V-shaped step, said at least one passageway further comprising a second plurality of air passageways connected to the air outlet ports disposed in the other leg of the V-shaped step.

4. The forced air cavity and control system for watercraft according to claim 1, further comprising:
    at least one actuator connected to the air scoop, the actuator being extendable and retractable to adjustably open and close said air scoop;
    an actuator control switch operably connected to the at least one actuator.

5. The forced air cavity and control system for watercraft according to claim 4, wherein said at least one actuator comprises a hydraulic ram.

6. The forced air cavity and control system for watercraft according to claim 1, further comprising:
    a water drain disposed in a floor of the air chamber;
    a tube connected to the water drain, the tube leading to the air passageway and providing suction to drain excess water from the air chamber.

7. The forced air cavity and control system for watercraft according to claim 6, wherein the floor of the air chamber is concave.

8. The forced air cavity and control system for watercraft according to claim 1, further comprising a cover plate disposed over the housing.

9. The forced air cavity and control system for watercraft according to claim 1, further comprising a columnar brace reinforcing attachment of the air chamber and air scoop to the watercraft.

10. A watercraft having a forced air cavity system, the watercraft comprising:
    a boat having a bow, a hull, and a stern;
    a plurality of elongate ice runners extending longitudinally below the hull;

a housing defining an air chamber atop the boat;

an air scoop pivotally attached to the housing, the air scoop adjustably pivoting to regulate a flow rate of air into the air chamber when the watercraft is in motion;

at least one air passageway connected to the air chamber; and at least one V-shaped step defined in a hull of the watercraft, the step having at least one air outlet port defined therein, the air passageway extending to the air outlet port, the V-shaped step being formed by two legs and located forward of the plurality of ice runners.

11. The watercraft according to claim 10, further comprising an auxiliary V-shaped step disposed on the hull.

12. The watercraft according to claim 10, further comprising a dowel extending longitudinally along the elongate ice runners.

13. The watercraft according to claim 10, wherein said at least one air outlet port comprises a plurality of air outlet ports, said at least one air passageway comprising a first plurality of air passageways connected to the air outlet ports disposed in one leg of the V-shaped step, said at least one passageway further comprising a second plurality of air passageways connected to the air outlet ports disposed in the other leg of the V-shaped step.

14. The watercraft according to claim 10, further comprising:

at least one actuator connected to the air scoop, the actuator being extendable and retractable to adjustably open and close said air scoop;

an actuator control switch operably connected to the at least one actuator.

15. The watercraft according to claim 14, wherein the at least one actuator comprises a hydraulic ram.

16. The watercraft according to claim 10, further comprising:

a water drain disposed in a floor of the air chamber;

a tube connected to the water drain, the tube leading to the air passageway and providing suction to drain excess water from the air chamber.

17. The watercraft according to claim 16, wherein the floor of the air chamber is concave.

18. The watercraft according to claim 10, further comprising a cover plate disposed over the air scoop.

19. The watercraft according to claim 10, further comprising a columnar brace reinforcing attachment of the air chamber and air scoop to the watercraft.

* * * * *